Jan. 9, 1968     N. O. STEIGER     3,362,105
LINERS FOR FLOWERPOTS, PLANTERS, AND THE LIKE, AND
MEANS FOR SECURING SAID LINERS THERETO
Filed Aug. 18, 1965
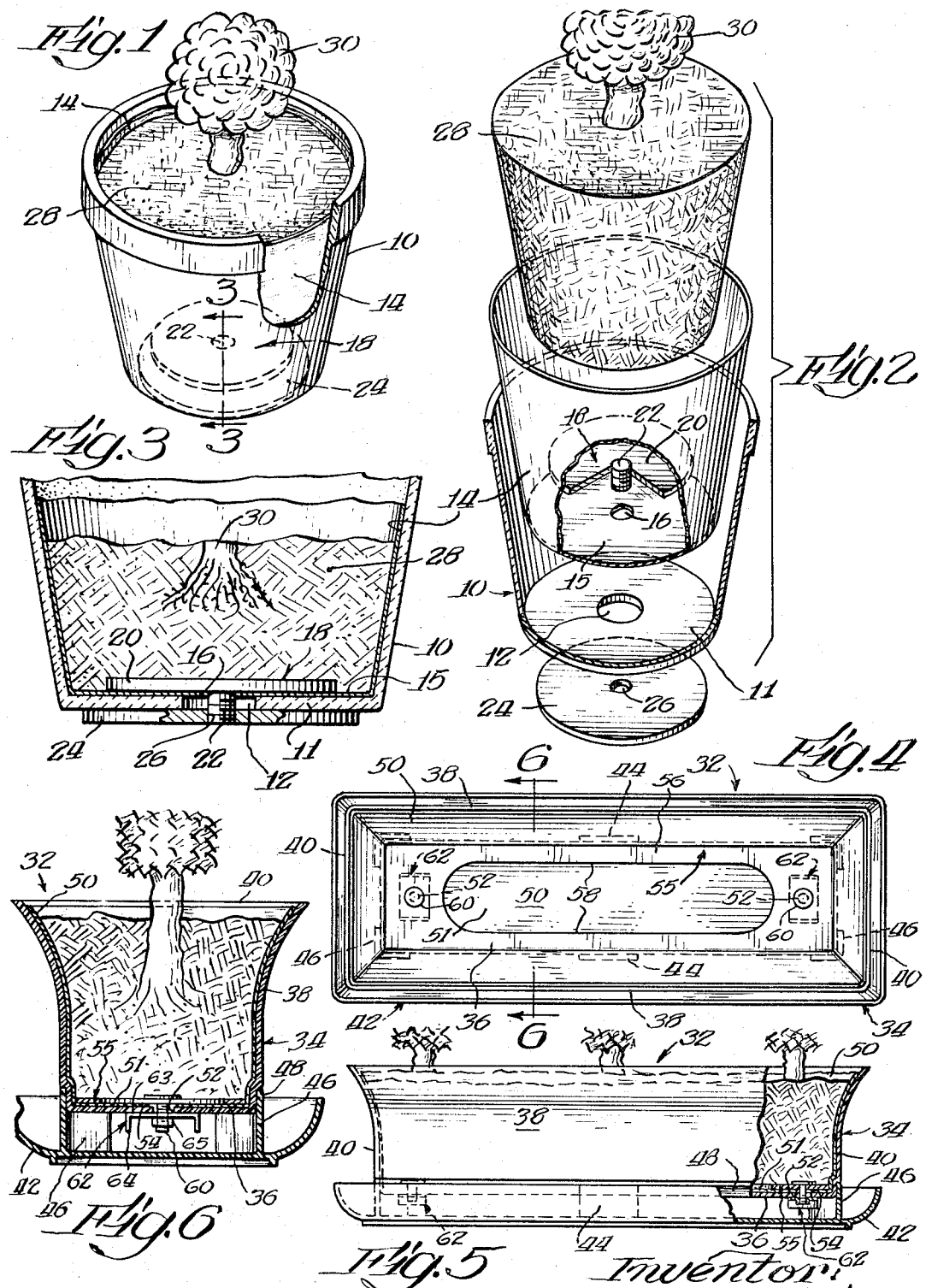
INVENTOR:
Norman O. Steiger
BY Max R. Kraus Atty.

ium Patent Office
3,362,105
Patented Jan. 9, 1968

3,362,105
LINERS FOR FLOWERPOTS, PLANTERS, AND THE LIKE, AND MEANS FOR SECURING SAID LINERS THERETO
Norman O. Steiger, 652 Polk St., Gary, Ind. 46402
Filed Aug. 18, 1965, Ser. No. 480,650
4 Claims. (Cl. 47—34)

This invention relates to improvements in liners for flowerpots, planters, and the like, and to the means for securing said liners thereto.

One of the objects of this invention is to provide a liner for a flowerpot, planter, and the like, and the means for securing said liner thereto.

Another object of this invention is to provide means for securing a liner to a flowerpot, planter, and the like, said means serving to retain the liner in the pot or planter, and being so constructed that the liner may be readily removed when desired, for the purpose of removing the liner with the soil and plants therewithin for transplanting and the like.

Another object of this invention is to provide a liner retainer which is very simple and inexpensive to produce, which is easy to adapt to conventional flowerpots and planters, and one which may be readily used with great effectiveness.

Other objects will become apparent as this description progresses.

In the drawings:

FIG. 1 is a perspective view of the invention as applied to a conventional flowerpot.

FIG. 2 is an exploded view of FIG. 1.

FIG. 3 is a sectional view taken on line 3—3 of FIG. 1.

FIG. 4 is a top plan view of the invention as applied to a planter.

FIG. 5 is a longitudinal sectional view of FIG. 4, and

FIG. 6 is a sectional view taken on line 6—6 of FIG. 4.

Referring to the embodiment shown in FIGS. 1 to 3 inclusive, the conventional flowerpot which is of the clay type and is well-known is generally designated by the numeral 10. The flowerpot is provided with a bottom 11 which has a central bottom opening 12. The liner is made preferably from an aluminum foil and is shaped to the configuration of the pot so that it may be positioned therewithin. The liner may be preformed in the shape shown or may be molded by the hand from a sheet of aluminum foil to form the shape. The liner is designated by the numeral 14. The bottom or base 15 of the liner is provided with a central opening 16 which will aline with the opening 12 in the flowerpot.

To retain the liner in position in said pot there is provided a retainer generally indicated at 18 which includes a circular plate 20 to which is fixed a threaded stud 22. Said retainer is positioned inside the flowerpot so that the circular plate 20 rests on the bottom or base 15 of the liner, with the threaded stud 22 extending through the two alined openings 16 and 12. The threaded stud 22 will extend below the base 11 of the flowerpot. A locking plate 24 of circular shape, having a central threaded aperture 26, is positioned against the bottom of the flowerpot and is then brought into threaded engagement with the threaded stud 22 to lock the retainer to the flowerpot. This locking arrangement will secure the liner in the flowerpot against any accidental removal. The flowerpot is now in condition so that the soil 28 and the plant 30 may be put into the flowerpot with same being positioned inside the liner. As can be appreciated, if the flowerpot should be turned on its side or even inverted, the liner 14 will be retained in the flowerpot and will not fall out, and the soil and plant will remain within the liner.

For the purpose of removing the soil within the liner for transplanting and the like, the locking plate 24 is rotated in a reverse direction to unthread from the threaded stud 22. This will free the plate 20 inside the liner so that the liner and the soil and plant therewithin may be lifted bodily from the flowerpot. When thus removed the soil and plant may be placed in another pot or in other soil and the liner 14 may be removed therefrom.

In the modified form shown in FIGS. 4, 5 and 6, the planter is designated by the numeral 32 and comprises a generally rectangular-shaped container 34 having a bottom 36 and side and end walls 38 and 40 respectively. The container is adapted to be supported in a base generally indicated by the numeral 42. The base is provided with spaced upstanding side and end uprights 44 and 46 respectively. The bottom 36 of the container is recessed or indented to provide a continuous shoulder 48 and the container 34 is positioned on said uprights so that the shoulder 48 rests on top of the uprights to space the bottom of the container from the base. The aforementioned device is a conventional planter which is on the market.

The present invention is directed toward providing a liner to be positioned within the container 34 and to the means for securing said liner to said container. The liner 50 is formed preferably of aluminum foil and is shaped to fit within the container 34. The liner has a bottom 51. As previously stated, the liner may be preformed to the shape of the container to fit therewithin, or the liner may be molded from a strip of aluminum foil and shaped to conform to such container. While the preferred material for the liner has herein been described as aluminum foil, it is understood that the liner may be formed of any other suitable material and that the invention herein is not limited to aluminum foil but embraces all materials which may be used as liners.

The bottom 36 of the container 34 is provided with a pair of spaced openings 52, one adjacent each of the opposite ends. The bottom 51 of the liner is provided with spaced openings 54 which aline with the openings 52 in the bottom of the container. To retain the liner 50 within said container there is provided a retainer generally indicated at 55, which includes a plate 56, best shown in FIG. 4, which is shaped to conform to the bottom of the container. Plate 56 has an elongated cutout 58. The plate 56 is provided with threaded studs 60, one adjacent each of the opposite ends of said plate, which extend below said plate. The plate 56 is positioned inside the container against the bottom 51 of the liner, with the threaded studs 60 passing through the opening 54 in the liner 50 and the openings 52 in the base of the container so that the studs 60 extend outwardly below the base of the container. A locking member generally indicated at 62 is secured to the threaded studs 60 to lock the retainer 55 and thereby lock the liner 50 in the container 34. The locking member 62 includes a rectangular-shaped plate 63 having depending side flanges 64. The plate 63 has a central opening to which is secured a threaded nut 65 which engages the threaded stud 60.

If desired, the liner 50 may be provided with small openings throughout its side and bottom walls, and this is likewise true in connection with the liner 14 shown in FIGS. 1 to 3.

It will be understood that various changes and modifications may be made from the foregoing without departing from the spirit and scope of the appended claims.

What is claimed is:

1. A conventional container for soil, plants, and the like, a removable liner of a generally flexible, pliable and tearable material positioned within said conventional container, said liner having a continuous side wall hugging the interior wall of the container and having a bottom wall engaging the bottom wall of the container so that the soil, plant, and the like are positioned within said liner and removable with the removal of said liner, the bottom wall of said container having an opening and the bottom wall of the liner having an opening in alinement with the opening in the bottom wall of the container, a member positioned inside the container and liner and adapted to rest on the bottom wall of the liner and cover a substantial portion of the bottom wall of the liner, means connected to said member and extending through said alined openings and extending exteriorly of the bottom of said container, and a locking member secured to said means for securing said liner in said container so that said liner does not fall out of the container when inverted, said liner capable of being removed from said container with the soil and plant in said liner when the locking member is disengaged from the means which secures said liner in said container, said liner capable of being readily removed as by tearing same away from the soil and plant in said liner when the liner is removed from the container, said locking member forming a flat base on which the container rests.

2. A structure defined in claim 1 in which the member positioned inside the container and liner comprises a plate, said plate having a threaded member extending through the alined openings in said liner and container and the locking member being internally threaded for securement to said threaded member on said plate.

3. A structure defined in claim 1 in which the liner is of aluminum foil.

4. A structure defined in claim 1 in which the container is a clay pot of generally frusto-conical shape.

References Cited

UNITED STATES PATENTS

| | | | |
|---|---|---|---|
| 155,525 | 9/1874 | Landers | 47—35 |
| 2,038,019 | 2/1935 | Wright. | |
| 2,605,588 | 2/1948 | Lindstaedt | 47—35 X |
| 3,016,594 | 1/1962 | Jacomaro. | |
| 3,082,575 | 3/1963 | Schultz | 47—37 |
| 3,137,096 | 6/1964 | Hopkins | 47—38 |
| 2,659,180 | 11/1953 | Acton | 47—38.1 |
| 3,220,144 | 11/1965 | Green | 47—38.1 |

ABRAHAM G. STONE, *Primary Examiner.*

R. CARTER, P. A. RAZZANO, *Assistant Examiners.*